United States Patent
Hashimoto (10) Patent No.: US 9,354,428 B2
(45) Date of Patent: May 31, 2016

(54) IMAGING LENS (71) Applicant: KANTATSU CO., LTD., Yaita-shi, Tochigi (JP)

(72) Inventor: Masaya Hashimoto, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 0 days.

(21) Appl. No.: 14/496,173

(22) Filed: Sep. 25, 2014

(65) Prior Publication Data

US 2015/0205071 A1    Jul. 23, 2015

(30) Foreign Application Priority Data

Jan. 23, 2014    (JP) .................. 2014-009976

(51) Int. Cl.
| | | |
|---|---|---|
| *G02B 13/18* | (2006.01) | |
| *G02B 9/62* | (2006.01) | |
| *G02B 13/00* | (2006.01) | |

(52) U.S. Cl.
CPC .............. *G02B 13/0045* (2013.01); *G02B 9/62* (2013.01)

(58) Field of Classification Search
CPC ............................. G02B 9/62; G02B 13/0045
USPC ........................ 359/713, 757, 708, 752, 756
See application file for complete search history.

(56) References Cited

U.S. PATENT DOCUMENTS

2014/0153113 A1*  6/2014  Tsai ................. G02B 13/18
                                                           359/713
2015/0002728 A1*  1/2015  Tsai .................. G02B 9/60
                                                           348/360
2015/0085175 A1   3/2015  Huang
2015/0085183 A1   3/2015  Chen

FOREIGN PATENT DOCUMENTS

| JP | 2010-026434 A | 2/2010 |
|---|---|---|
| JP | 2011-085733 A | 4/2011 |

* cited by examiner

*Primary Examiner* — William Choi
(74) *Attorney, Agent, or Firm* — Westerman, Hattori, Daniels & Adrian, LLP (57) ABSTRACT

An imaging lens elements are arranged from an object side as follows: a positive first lens having a convex object-side surface; a meniscus negative second lens having a concave object-side surface; a double-sided aspheric third lens; a double-sided aspheric fourth lens; a positive fifth lens having a convex image-side surface near an optical axis; and a double-sided aspheric negative sixth lens having a concave image-side surface near the axis. Each element is arranged with an air gap from a neighboring element. The sixth lens image-side surface has an off-axial pole-change point. The imaging lens satisfies conditional expressions below:

$$20 < vd1 - vd2 < 50 \quad (1)$$

$$20 < vd1 - vd3 < 50 \quad (2)$$

where
vd1: First lens Abbe number at d-ray
vd2: Second lens Abbe number at d-ray
vd3: Third lens Abbe number at d-ray.

A clean copy of the abstract follows the last page of this response.

8 Claims, 6 Drawing Sheets

IMAGING LENS

The present application is based on and claims priority of Japanese patent application No. 2014-009976 filed on Jan. 23, 2014, the entire contents of which are hereby incorporated by reference.

BACKGROUND OF THE INVENTION

1. Field of the Invention

The present invention relates to an imaging lens which forms an image of an object on a solid-state image sensor such as a CCD sensor or a C-MOS sensor used in a compact image pickup device, and more particularly to an imaging lens which is built in image pickup devices mounted in increasingly compact and low-profile smartphones and mobile phones, PDAs (Personal Digital Assistants), game consoles, information terminals such as PCs, and home appliances with a camera function.

2. Description of the Related Art

In recent years, there has been a general tendency that most information terminals have a camera function. Also, home appliances with a camera function have been introduced into the market; for example, a user who is away from home can see in real time what is going on at home, through the camera mounted in a home appliance by telecommunication between the home appliance and his/her smartphone. It is thought that products which enhance consumer convenience by adding a camera function to an information terminal or home appliance will be increasingly developed in the future. In addition, the camera mounted in such a product is expected to not only provide high resolution to cope with an increase in the number of pixels but also be compact and low-profile and provide high brightness and a wide field of view. In particular, the imaging lens to be built in mobile terminals is strongly expected to be low-profile enough to be applicable to low-profile products.

However, in order to provide a low-profile imaging lens with a wide field of view and high brightness as described above, the following problem has to be addressed: it is difficult to correct aberrations in the peripheral area of the image and ensure high imaging performance throughout the image.

Conventionally, for example, the imaging lenses described in JP-A-2010-026434 (Patent Document 1) and JP-A-2011-085733 (Patent Document 2) are known as compact high-resolution imaging lenses.

Patent Document 1 discloses an imaging lens composed of five constituent lenses, which includes, in order from an object side, a positive first lens, a positive second lens, a negative third lens, a positive fourth lens, and a negative fifth lens, features compactness and high brightness with an F-value of about 2, and corrects various aberrations properly.

Patent Document 2 discloses an imaging lens which includes a first lens group including a first lens having a convex surface on an object side, a second lens group including a second lens having a concave surface on an image side, a third lens group including a meniscus third lens having a concave surface on the object side, a fourth lens group including a meniscus fourth lens having a concave surface on the object side, and a fifth lens group including a meniscus fifth lens having an aspheric surface with an inflection point on the object side. This imaging lens is intended to realize a compact lens system with high resolution.

The imaging lens described in Patent Document 1, composed of five constituent lenses, corrects various aberrations properly and provides high brightness with an F-value of about 2.0 to about 2.5; however, its total track length is longer than the diagonal length of the effective imaging plane of the image sensor, bringing about a disadvantage in making the imaging lens low-profile. Furthermore, if this lens configuration is designed to provide a wide field of view, it will be difficult to correct aberrations in the peripheral area of the image properly.

The imaging lens described in Patent Document 2 provides a lens system which is relatively low-profile and able to correct aberrations properly. However, in order to ensure brightness with an F-value of 2.8 or less and a field of view of 65 degrees or more, the problem of difficulty in correcting aberrations in the peripheral area of the image must be addressed.

As stated above, in the conventional art, it is difficult to provide a low-profile imaging lens with a wide field of view which features high brightness and high resolution.

SUMMARY OF THE INVENTION

The present invention has been made in view of the above problem, and an object thereof is to provide a compact low-cost imaging lens which meets the demand for low-profileness in spite of an increase in the number of constituent lenses, offers high brightness with an F-value of 2.5 or less and a wide field of view, and corrects various aberrations properly.

Here, the term "low-profile" implies that the total track length is shorter than the diagonal length of the effective imaging plane of the image sensor, and the expression "wide field of view" implies that the field of view is 70 degrees or more. The diagonal length of the effective imaging plane of the image sensor means the diameter of an effective image circle whose radius is the vertical height from an optical axis to the position where a light ray incident on the imaging lens at a maximum field of view enters the image plane, namely the maximum image height.

According to one aspect of the present invention, there is provided an imaging lens in which elements are arranged in the following order from an object side to an image side: a first lens with positive refractive power having a convex surface on the object side; a second lens with negative refractive power as a meniscus lens having a concave surface on the object side; a third lens as a double-sided aspheric lens; a fourth lens as a double-sided aspheric lens; a fifth lens with positive refractive power having a convex surface near an optical axis on the image side; and a sixth lens with negative refractive power as a double-sided aspheric lens having a concave surface near the optical axis on the image side. These elements are each arranged with an air gap from a neighboring element. The image-side surface of the sixth lens has a pole-change point off the optical axis, and the imaging lens satisfies conditional expressions (1) and (2) below:

$$20 < vd1 - vd2 < 50 \qquad (1)$$

$$20 < vd1 - vd3 < 50 \qquad (2)$$

where
vd1: Abbe number of the first lens at d-ray
vd2: Abbe number of the second lens at d-ray
vd3: Abbe number of the third lens at d-ray.

In the imaging lens with the above configuration, the first lens and the fifth lens have relatively strong positive refractive powers to offer a low-profile design. The second lens, having negative refractive power, properly corrects spherical aberrations and astigmatism mainly in the peripheral portion. The third lens, a double-sided aspheric lens, properly corrects spherical aberrations and chromatic aberrations. The fourth lens, a double-sided aspheric lens, properly corrects axial chromatic aberrations, high-order spherical aberrations, coma aberrations, and field curvature. The sixth lens corrects spherical aberrations which occur on the fifth lens, and its image-side surface has an aspheric shape with a pole-change point off the optical axis, so that field curvature and distortion are corrected, and the angle of a chief ray incident on the image sensor is also properly controlled from the center to the peripheral area of the image. A "pole-change point" here means a point on an aspheric surface at which a tangential plane intersects the optical axis perpendicularly.

Since the above configuration is adopted and refractive power is appropriately distributed to the respective constituent lenses, the imaging lens can be a low-profile high-performance imaging lens. Since all the constituent lenses are arranged with an air gap from a neighboring element, the imaging lens can have a large number of aspheric surfaces to provide the ability to correct aberrations properly.

The conditional expression (1) defines an appropriate range for the relation between the Abbe numbers of the first lens and the second lens at d-ray, and the conditional expression (2) defines an appropriate range for the relation between the Abbe numbers of the first lens and the third lens at d-ray. By using materials which satisfy these conditional expressions, chromatic aberrations are corrected properly.

Preferably, in the imaging lens according to the present invention, the third lens has negative refractive power, and a conditional expression (3) below is satisfied:

$$4 < f2/f3 < 32 \tag{3}$$

where
f2: focal length of the second lens
f3: focal length of the third lens.

The conditional expression (3) defines an appropriate range for the ratio of the focal length of the second lens to the focal length of the third lens representing the relation in refractive power between the second and third lenses, and indicates a condition to correct various aberrations and keep the manufacturing error sensitivity low. If the value is above the upper limit of the conditional expression (3), the negative refractive power of the second lens would be too weak to correct chromatic aberrations though it would be advantageous in correcting field curvature and spherical aberrations. On the other hand, if the value is below the lower limit of the conditional expression (3), it would be difficult to correct field curvature and spherical aberrations though it would be advantageous in correcting chromatic aberrations. When the conditional expression (3) is satisfied, field curvature and spherical aberrations are corrected in a balanced manner, and chromatic aberrations and high-order aberrations are also corrected. Furthermore, negative refractive power is appropriately distributed to the second lens and the third lens, so an increase in the manufacturing error sensitivity is suppressed.

More preferably, the imaging lens satisfies a conditional expression (3a) below:

$$5 < f2/f3 < 29. \tag{3a}$$

Preferably, the imaging lens according to the present invention satisfies a conditional expression (4) below:

$$0.4 < |f1/f3| < 1.0 \tag{4}$$

where
f1: focal length of the first lens
f3: focal length of the third lens.

The conditional expression (4) defines an appropriate range for the ratio of the focal length of the first lens to the focal length of the third lens representing the relation in refractive power between the first and third lenses, and indicates a condition to offer a low-profile design and correct chromatic aberrations properly. If the value is above the upper limit of the conditional expression (4), the refractive power of the first lens would be too weak to ensure a short total track length. On the other hand, if the value is below the lower limit of the conditional expression (4), the refractive power of the first lens would be too strong to correct chromatic aberrations properly.

More preferably, the imaging lens satisfies a conditional expression (4a) below:

$$0.4 < |f1/f3| < 0.9. \tag{4a}$$

Preferably, the imaging lens according to the present invention satisfies a conditional expression (5) below:

$$0.1 < |r1/r2| < 0.5 \tag{5}$$

where
r1: curvature radius of the object-side surface of the first lens
r2: curvature radius of the image-side surface of the first lens.

The conditional expression (5) defines an appropriate range for the curvature radius ratio between the object-side and image-side surfaces of the first lens representing the paraxial shape of the first lens, and indicates a condition to offer a low-profile design and correct spherical aberrations properly. If the value is above the upper limit of the conditional expression (5), the refractive power of the object-side surface of the first lens would be too weak to offer a low-profile design. On the other hand, if the value is below the lower limit of the conditional expression (5), the refractive power of the object-side surface of the first lens would be too strong to correct spherical aberrations.

More preferably, the imaging lens satisfies a conditional expression (5a) below:

$$0.15 < |r1/r2| < 0.4. \tag{5a}$$

Preferably, the second lens of the imaging lens according to the present invention has such an aspheric shape that the negative refractive power becomes weaker with increasing distance from the optical axis and changes to positive refractive power in its peripheral portion. Due to this aspheric shape, the angle of light rays emitted from the second lens in the peripheral portion is controlled so that aberrations of marginal rays which are likely to occur near the aperture stop are suppressed. Therefore, the aberrations in the peripheral portion which are attributable to a low F-value and a wide field of view are suppressed.

Preferably, in the imaging lens according to the present invention, the third lens has a biconcave shape near the optical axis and its image-side surface has an aspheric shape in which negative refractive power becomes stronger with increasing distance from the optical axis. This aspheric shape makes it possible to control the angle of light rays in the peripheral portion properly.

Preferably, in the imaging lens according to the present invention, the fourth lens has a biconvex shape near the optical axis and satisfies a conditional expression (6) below:

$$0.1 < |r7/r8| < 1.1 \tag{6}$$

where
r7: curvature radius of the object-side surface of the fourth lens
r8: curvature radius of the image-side surface of the fourth lens.

The conditional expression (6) defines an appropriate range for the curvature radius ratio between the object-side surface and image-side surface of the fourth lens representing the paraxial shape of the fourth lens, and indicates a condition to correct various aberrations properly. If the value is above the upper limit or below the lower limit of the conditional expression (6), undesirably it would be difficult to correct coma aberrations and field curvature in the peripheral portion, and an increase in astigmatism would result.

More preferably, the imaging lens satisfies a conditional expression (6a) below:

$$0.2<|r7/r8|<1.0. \quad (6a)$$

Preferably, the imaging lens according to the present invention satisfies conditional expressions (7) and (8) below:

$$0.3<f5/f<0.9 \quad (7)$$

$$0.3<|f6|/f<0.9 \quad (8)$$

where f: focal length of the overall optical system of the imaging lens
f5: focal length of the fifth lens
f6: focal length of the sixth lens.

The conditional expression (7) defines an appropriate range for the ratio of the focal length of the fifth lens to the focal length of the overall optical system of the imaging lens representing the refractive power of the fifth lens with respect to the refractive power of the overall optical system of the imaging lens. The conditional expression (8) defines an appropriate range for the ratio of the focal length of the sixth lens to the focal length of the overall optical system of the imaging lens representing the refractive power of the sixth lens with respect to the refractive power of the overall optical system of the imaging lens. Both the conditional expressions (7) and (8) indicate conditions to offer a low-profile design and correct various aberrations properly. If the value is above the upper limit of the conditional expression (7), the positive refractive power of the fifth lens would be too weak to offer a low-profile design. On the other hand, if the value is below the lower limit of the conditional expression (7), the positive refractive power of the fifth lens would be too strong to correct spherical aberrations and coma aberrations. If the value is above the upper limit of the conditional expression (8), the negative refractive power of the sixth lens would be too weak to correct chromatic aberrations. On the other hand, if the value is below the lower limit of the conditional expression (8), the negative refractive power of the sixth lens would be too strong to offer a low-profile design. When the conditional expressions (7) and (8) are satisfied, the imaging lens provides an optical system which corrects aberrations and has a short total track length.

More preferably, the imaging lens satisfies conditional expressions (7a) and (8a) below:

$$0.45<f5/f<0.75 \quad (7a)$$

$$0.35<|f6|/f<0.65. \quad (8a)$$

Preferably, the imaging lens according to the present invention satisfies a conditional expression (9) below:

$$0.9<TLA/f<1.3 \quad (9)$$

where

TLA: distance on the optical axis from the object-side surface of the first lens to the image plane (distance without the filter)
f: focal length of the overall optical system of the imaging lens.

The conditional expression (9) defines an appropriate range for the ratio of total track length to the focal length of the overall optical system of the imaging lens. If the value is above the upper limit of the conditional expression (9), the total track length would be too long to meet the demand for low-profileness though the freedom in the shapes of the constituent lenses would increase and thus make it easy for the lens system to correct various aberrations. On the other hand, if the value is below the lower limit of the conditional expression (9), the total track length would be too short to correct various aberrations though it would be advantageous in offering a low-profile design, because restrictions would be imposed on the shapes of the constituent lenses.

Preferably, the imaging lens according to the present invention satisfies a conditional expression (10) below:

$$0.65<TLA/2ih<0.85 \quad (10)$$

where

TLA: distance on the optical axis from the object-side surface of the first lens to the image plane (distance without the filter)
ih: maximum image height.

The conditional expression (10) defines an appropriate range for the ratio between total track length and maximum image height, and indicates a condition to keep the imaging lens low-profile. If the value is above the upper limit of the conditional expression (10), it would be impossible to meet the demand for low-profileness. On the other hand, if the value is below the lower limit of the conditional expression (10), the total track length would be too short to correct various aberrations properly, and undesirably the manufacturing error sensitivity would easily increase.

Preferably, the imaging lens according to the present invention satisfies a conditional expression (11) below:

$$f1>f5 \quad (11)$$

where f1: focal length of the first lens
f5: focal length of the fifth lens.

The conditional expression (11) defines an appropriate relation between the focal length of the first lens and the focal length of the fifth lens representing the relation in positive refractive power between the first and fifth lenses, and indicates a condition to offer a low-profile design and provide a low F-value and a wide field of view. When the refractive power of the fifth lens is stronger than that of the first lens, the positive refractive power of the first lens is less likely to be too strong, and it is easy to correct aberrations attributable to a low F-value and a wide field of view.

Preferably, in the imaging lens according to the present invention, all the constituent lenses are made of plastic material. If so, the imaging lens can be mass-produced by injection molding, and can be supplied at low cost.

DETAILED DESCRIPTION OF THE PREFERRED EMBODIMENTS

Figure 1:
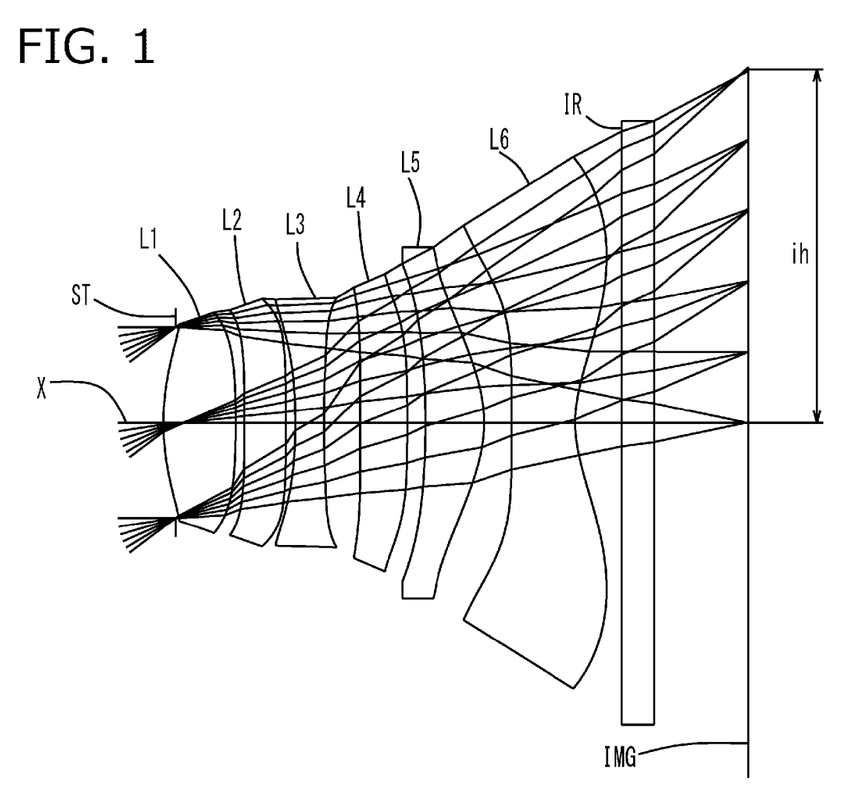
FIG. 1 is a schematic view showing the general configuration of an imaging lens in Example 1.
Figure 3:
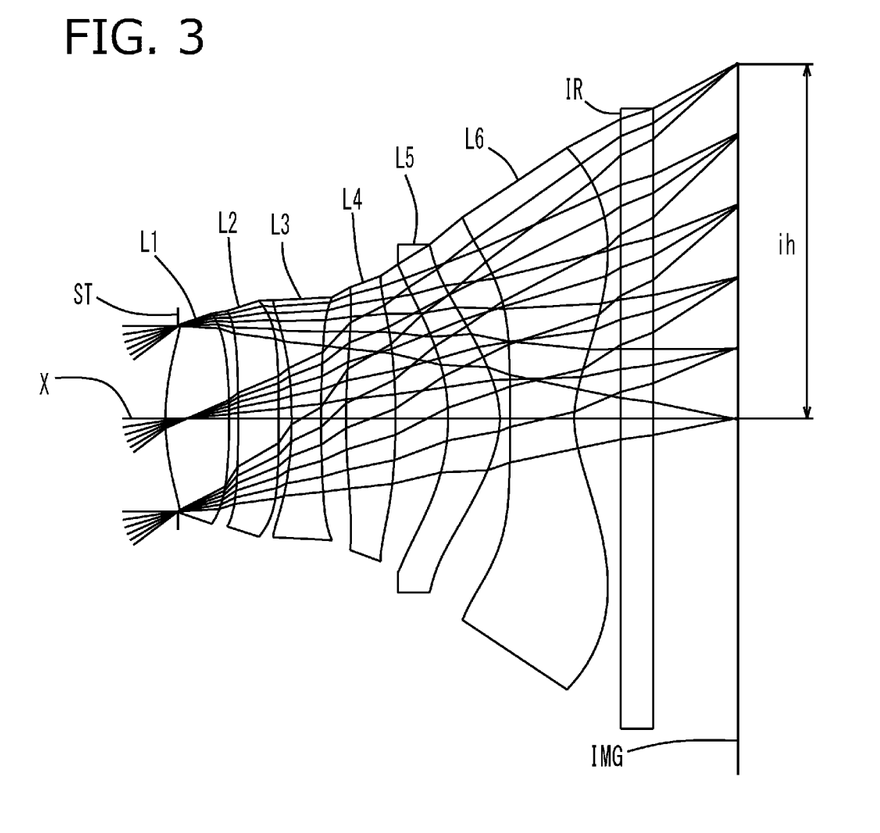
FIG. 3 is a schematic view showing the general configuration of an imaging lens in Example 2.
Figure 5:
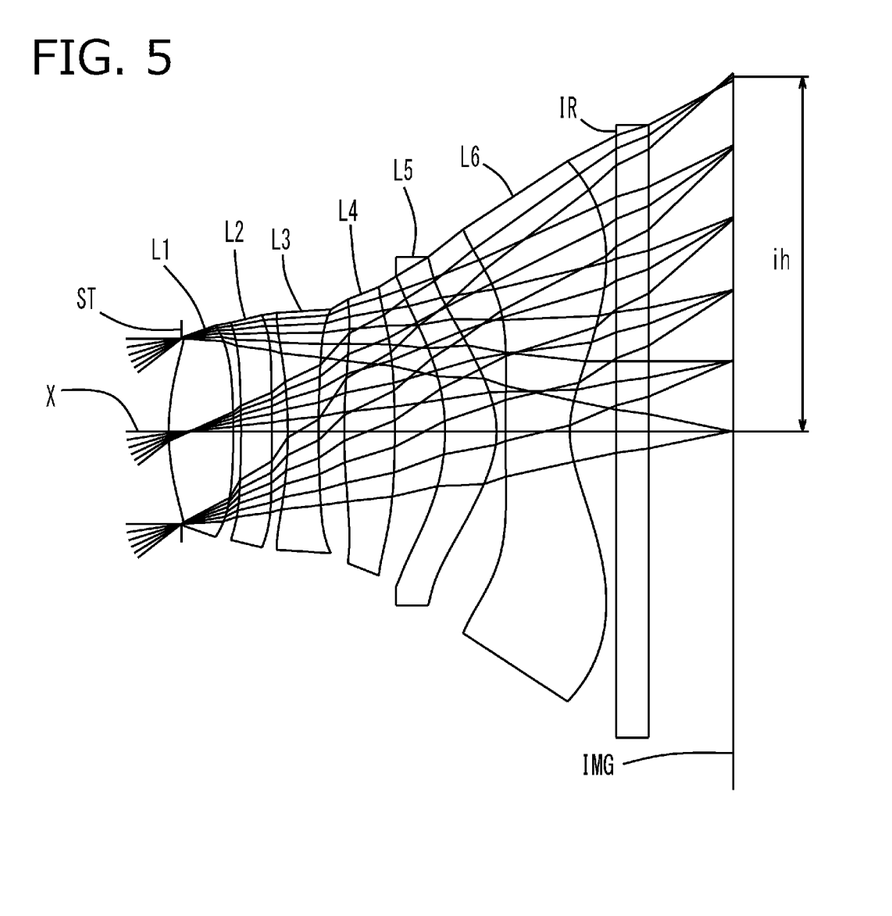
FIG. 5 is a schematic view showing the general configuration of an imaging lens in Example 3.

Hereinafter, the preferred embodiment of the present invention will be described in detail referring to the accompanying drawings. FIGS. 1, 3, and 5 are schematic views showing the general configurations of the imaging lenses in Examples 1 to 3 according to this embodiment, respectively. Since all these examples have the same basic lens configuration, the general configuration of an imaging lens according to this embodiment is explained below referring to the schematic view of Example 1.

As shown in FIG. 1, the imaging lens according to this embodiment includes, in order from an object side to an image side, a first lens L1 with positive refractive power having a convex surface on the object side, a second lens L2 with negative refractive power as a meniscus lens having a concave surface on the object side, a third lens L3 as a double-sided aspheric lens, a fourth lens L4 as a double-sided aspheric lens, a fifth lens L5 with positive refractive power having a convex surface near an optical axis X on the image side, and a sixth lens L6 with negative refractive power as a double-sided aspheric lens having a concave surface near the optical axis X on the image side. These constituent lenses are each arranged with an air gap from a neighboring lens. The image-side surface of the sixth lens L6 has an aspheric shape with a pole-change point off the optical axis X. A filter IR such as an infrared cut filter is located between the sixth lens L6 and an image plane IMG. The filter IR is omissible. The total track length and back focus of the imaging lens according to this embodiment are each defined as a distance without the filter IR.

In the imaging lens according to this embodiment, the first lens L1 and the fifth lens L5 have relatively strong positive refractive power to offer a low-profile design. The second lens L2, having negative refractive power, properly corrects spherical aberrations and astigmatism mainly in the peripheral portion, the third lens L3, a double-sided aspheric lens, properly corrects spherical aberrations and chromatic aberrations, and the fourth lens L4, a double-sided aspheric lens, properly corrects axial chromatic aberrations, high-order spherical aberrations, coma aberrations, and field curvature. The sixth lens L6 corrects spherical aberrations which occur on the fifth lens L5, and through its aspheric image-side surface with a pole-change point off the optical axis X, it corrects field curvature and distortion, and properly controls the angle of a chief ray incident on the image sensor in the area from the center to the periphery of the image.

An aperture stop ST is located on the object side of the first lens L1. Therefore, the exit pupil position is remote from the image plane IMG, so it is easy to ensure telecentricity. When the above configuration is adopted and refractive power is appropriately distributed to the respective constituent lenses, the imaging lens can be a low-profile high-performance imaging lens. Since all the constituent lenses are arranged with an air gap from a neighboring lens, a large number of aspheric surfaces can be used, so that the imaging lens properly corrects aberrations.

The imaging lens according to this embodiment satisfies conditional expressions (1) to (11) below:

$$20 < vd1 - vd2 < 50 \quad (1)$$

$$20 < vd1 - vd3 < 50 \quad (2)$$

$$4 < f2/f3 < 32 \quad (3)$$

$$0.4 < |f1/f3| < 1.0 \quad (4)$$

$$0.1 < |r1/r2| < 0.5 \quad (5)$$

$$0.1 < |r7/r8| < 1.1 \quad (6)$$

$$0.3 < f5/f < 0.9 \quad (7)$$

$$0.3 < |f6|/f < 0.9 \quad (8)$$

$$0.9 < TLA/f < 1.3 \quad (9)$$

$$0.65 < TLA/2ih < 0.85 \quad (10)$$

$$f1 > f5 \quad (11)$$

where
- vd1: Abbe number of the first lens L1 at d-ray
- vd2: Abbe number of the second lens L2 at d-ray
- vd3: Abbe number of the third lens L3 at d-ray
- f: focal length of the overall optical system of the imaging lens
- f1: focal length of the first lens L1
- f2: focal length of the second lens L2
- f3: focal length of the third lens L3
- f5: focal length of the fifth lens L5
- f6: focal length of the sixth lens L6
- r1: curvature radius of the object-side surface of the first lens L1
- r2: curvature radius of the image-side surface of the first lens L1
- r7: curvature radius of the object-side surface of the fourth lens L4
- r8: curvature radius of the image-side surface of the fourth lens L4
- TLA: distance on the optical axis X from the object-side surface of the first lens L1 to the image plane IMG (distance without the filter IR)
- ih: maximum image height.

Since the Abbe numbers of the materials of the first lens L1 to the third lens L3 satisfy the conditional expressions (1) and (2), chromatic aberrations are properly corrected.

As for the refractive powers of the second lens L2 and the third lens L3, since the conditional expression (3) is satisfied, chromatic aberrations, field curvature, and spherical aberrations are properly corrected, and high-order aberration correction is achieved. In addition, since negative refractive power is distributed to the second lens L2 and the third lens L3, an increase in manufacturing error sensitivity is suppressed.

As for the refractive powers of the first lens L1 and the third lens L3, since the conditional expression (4) is satisfied, the imaging lens is low-profile and properly corrects chromatic aberrations.

As for the paraxial shape of the first lens L1, since the conditional expression (5) is satisfied, the imaging lens is low-profile and properly corrects spherical aberrations.

The second lens L2 has an aspheric shape in which the negative refractive power becomes weaker with increasing distance from the optical axis X and changes to positive refractive power in the lens peripheral portion. Therefore, the angle of light rays emitted from the second lens L2 in the peripheral portion is properly controlled, and aberrations of marginal rays which are likely to occur near the aperture stop ST are suppressed, so that aberrations in the peripheral portion which increase due to a low F-value and a wide field of view are suppressed.

The third lens L3 has a biconcave shape near the optical axis X and its image-side surface has an aspheric shape in which negative refractive power becomes stronger with increasing distance from the optical axis X, so that the angle of light rays in the peripheral portion of the third lens L3 is properly controlled.

The fourth lens L4 has a biconvex shape near the optical axis X and satisfies the conditional expression (6) concerning the relation between the curvature radii of the both surfaces, so that it properly corrects coma aberrations and field curvature in the peripheral portion.

As for the relation between the refractive power of the overall optical system of the imaging lens and the refractive power of the fifth lens L5, since the conditional expression (7) is satisfied, the imaging lens is low-profile, suppresses spherical aberrations, and facilitates correction of coma aberrations. As for the relation between the refractive power of the overall optical system of the imaging lens and the refractive power of the sixth lens L6, since the conditional expression (8) is satisfied, the imaging lens is low-profile. Since the conditional expressions (7) and (8) are satisfied, the imaging lens provides an optical system which corrects aberrations and has a short total track length.

As for the relation between the focal length of the overall optical system of the imaging lens and total track length, the conditional expression (9) is satisfied to give some latitude in the shapes of the constituent lenses, offer a low-profile design and facilitate correction of various aberrations.

As for the relation between the total track length of the imaging lens and the maximum image height, the conditional expression (10) is satisfied to ensure low-profileness, facilitate correction of aberrations and suppress an increase in manufacturing error sensitivity.

As for the positive refractive power of the first lens L1 and the positive refractive power of the fifth lens L5, the conditional expression (11) is satisfied to offer a low-profile design and provide a low F-value and a wide field of view.

In this embodiment, all the constituent lenses of the imaging lens are made of plastic material, so that the imaging lens can be mass-produced by injection molding. Therefore, a high-performance optical system can be supplied at low cost.

In this embodiment, all the lens surfaces are aspheric. The aspheric shapes of these lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4H^4 + A_6H^6 + A_8H^8 + A_{10}H^{10} + A_{12}H^{12} + A_{14}H^{14} + A_{16}H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, TLA denotes total track length with the filter IR removed, and bf denotes back focus with the filter IR removed. i denotes a surface number counted from the object side, r denotes a curvature radius, d denotes the distance on the optical axis between lens surfaces (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

Example 1

The basic lens data of Example 1 is shown in Table 1 below.

TABLE 1

Example 1
in mm
f = 3.02
Fno = 2.4
ω(°) = 37.1
ih = 2.30
TLA = 3.72
b f = 1.05

| | Surface Data | | | |
|---|---|---|---|---|
| Surface No. i | Curvature Radius r | Surface Distance d | Refractive Index Nd | Abbe Number vd |
| (Object Surface) | Infinity | Infinity | | |
| 1 (Stop) | Infinity | −0.078 | | |
| 2* | 1.6373 | 0.471 | 1.544 | 55.57 |
| 3* | −6.5916 | 0.056 | | |
| 4* | −24.2309 | 0.268 | 1.584 | 30.13 |
| 5* | −53.6765 | 0.061 | | |
| 6* | −3.8925 | 0.190 | 1.614 | 25.58 |
| 7* | 8.4023 | 0.233 | | |
| 8* | 33.3437 | 0.305 | 1.544 | 55.57 |
| 9* | −109.6529 | 0.118 | | |
| 10* | −6.0759 | 0.383 | 1.544 | 55.57 |
| 11* | −0.8843 | 0.176 | | |
| 12* | 20.4426 | 0.416 | 1.535 | 56.16 |
| 13* | 0.8508 | 0.300 | | |
| 14 | Infinity | 0.210 | 1.517 | 64.20 |
| 15 | Infinity | 0.607 | | |
| Image Plane | Infinity | | | |

TABLE 1-continued

Constituent Lens Data

| Lens | Start Surface | Focal Length |
|---|---|---|
| 1 | 2 | 2.461 |
| 2 | 4 | −75.927 |
| 3 | 6 | −4.306 |
| 4 | 8 | 47.053 |
| 5 | 10 | 1.855 |
| 6 | 12 | −1.673 |

Aspheric Surface Data

|  | 2nd Surface | 3rd Surface | 4th Surface | 5th Surface | 6th Surface | 7th Surface |
|---|---|---|---|---|---|---|
| k   | −1.308E+01 | 0.000E+00  | 0.000E+00  | 0.000E+00  | −5.432E+00 | 9.905E+01  |
| A4  | 3.169E−01  | −2.139E−01 | −1.102E−01 | −1.749E−01 | −3.263E−01 | −8.822E−02 |
| A6  | −8.915E−01 | −2.082E−01 | −3.151E−01 | 1.584E−02  | 1.054E−01  | −2.668E−02 |
| A8  | 1.671E+00  | −8.754E−01 | 1.503E+00  | 6.096E−01  | 1.942E+00  | 7.118E−01  |
| A10 | −2.822E+00 | 3.791E+00  | −8.996E+00 | −4.457E+00 | −4.730E+00 | −6.995E−01 |
| A12 | 9.089E−01  | −8.083E+00 | 1.967E+00  | 6.212E+00  | 3.489E+00  | 2.073E−01  |
| A14 | −1.764E−01 | 6.222E+00  | −1.542E+01 | −2.875E+00 | 0.000E+00  | 0.000E+00  |
| A16 | 0.000E+00  | 0.000E+00  | 0.000E+00  | 0.000E+00  | 0.000E+00  | 0.000E+00  |

|  | 8th Surface | 9th Surface | 10th Surface | 11th Surface | 12th Surface | 13th Surface |
|---|---|---|---|---|---|---|
| k   | 0.000E+00  | 0.000E4−00 | −5.637E+01 | −5.227E+00 | 0.000E+00  | −5.561E+00 |
| A4  | −9.617E−02 | −2.670E−01 | −7.867E−02 | −1.397E−01 | −2.171E−01 | −1.896E−01 |
| A6  | 1.820E−01  | 5.757E−02  | −8.189E−03 | 5.071E−01  | −2.038E−02 | 1.142E−01  |
| A8  | −1.136E+00 | 1.459E−04  | 2.589E−02  | −7.648E−01 | 4.946E−02  | −5.427E−02 |
| A10 | 2.584E+00  | 6.570E−02  | −1.432E−02 | 6.220E−01  | 3.550E−04  | 1.609E−02  |
| A12 | −2.537E+00 | 0.000E+00  | 0.000E+00  | −2.259E−01 | 5.446E−03  | −2.632E−03 |
| A14 | 9.429E−01  | 0.000E+00  | 0.000E+00  | 2.236E−02  | −4.458E−03 | 1.684E−04  |
| A16 | 0.000E+00  | 0.000E+00  | 0.000E+00  | 0.000E+00  | 0.000E+00  | 0.000E+00  |

As shown in Table 2 below, the imaging lens in Example 1 satisfies all the conditional expressions (1) to (11).

TABLE 2

| (1) 20 < vd1-vd2 < 50 | 25.44 |
|---|---|
| (2) 20 < vd1-vd3 < 50 | 29.99 |
| (3) 4 < f2/f3 < 32 | 17.63 |
| (4) 0.4 < f1/|f3| < 1.0 | 0.57 |
| (5) 0.1 < |r1/r2| < 0.5 | 0.25 |
| (6) 0.1 < |r7/r8| < 1.1 | 0.30 |
| (7) 0.3 < f5|f < 0.9 | 0.61 |
| (8) 0.3 < |f6|/f < 0.9 | 0.55 |
| (9) 0.9 < TLA/f < 1.3 | 1.23 |
| (10) 0.65 < TLA/2ih < 0.85 | 0.81 |
| (11) f1 > f5 | 2.461 > 1.855 |

Figure 2:
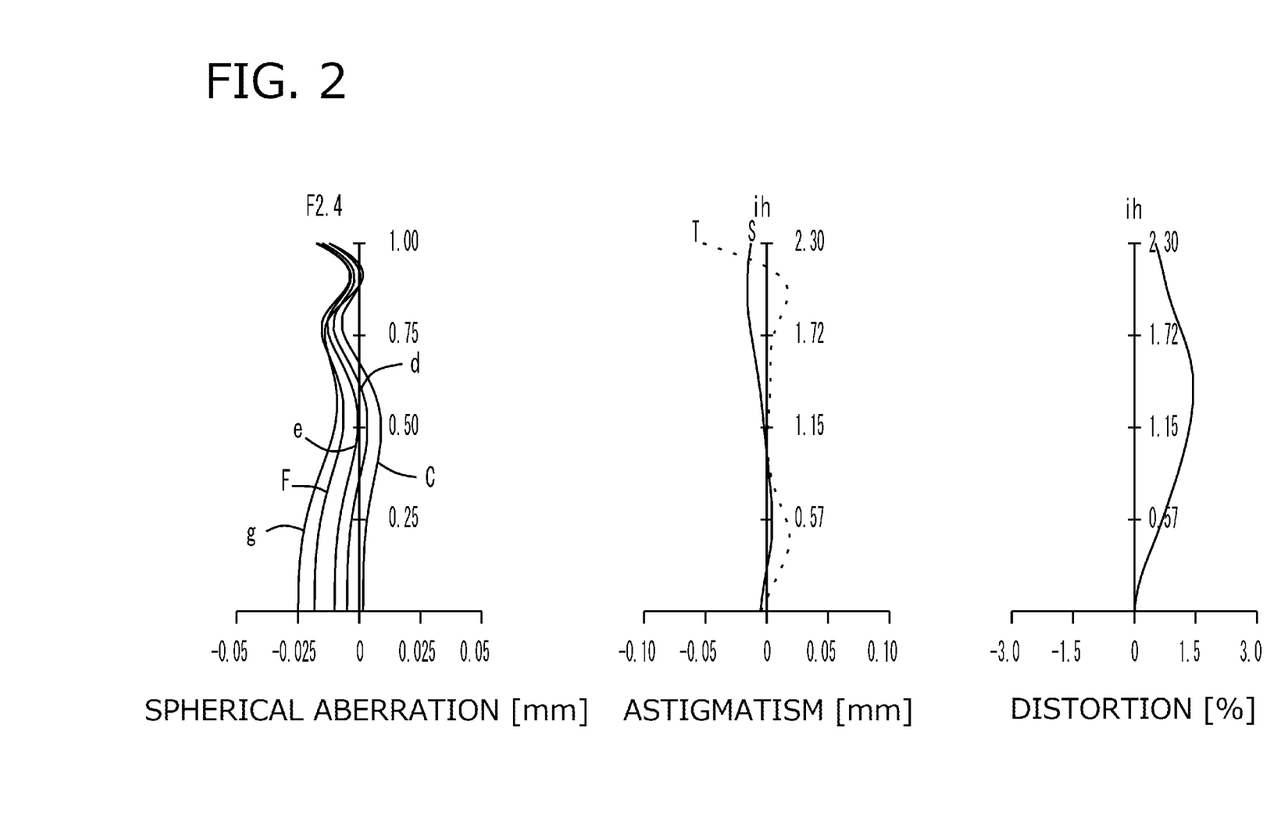
FIG. 2 shows spherical aberration, astigmatism, and distortion of the imaging lens in Example 1.

FIG. 2 shows spherical aberration (mm), astigmatism (mm), and distortion (%) of the imaging lens in Example 1. The spherical aberration diagram shows the amount of aberration at wavelengths of g-ray (436 nm), F-ray (486 nm), e-ray (546 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4 and 6). As shown in FIG. 2, each aberration is corrected properly.

Example 2

The basic lens data of Example 2 is shown in Table 3 below.

TABLE 3

Example 2
in mm
f = 3.01
Fno = 2.5
ω(°) = 37.2
ih = 2.30
TLA = 3.62
bf = 0.98

Surface Data

| Surface No. i | Curvature Radius r | Surface Distance d | Refractive Index Nd | Abbe Number vd |
|---|---|---|---|---|
| (Object Surface) | Infinity | Infinity |  |  |
| 1 (Stop) | Infinity | −0.081 |  |  |
| 2* | 1.5943 | 0.412 | 1.544 | 55.57 |
| 3* | −5.6906 | 0.060 |  |  |
| 4* | −10.6023 | 0.261 | 1.614 | 25.58 |
| 5* | −13.6178 | 0.084 |  |  |
| 6* | −2.9290 | 0.190 | 1.614 | 25.58 |

TABLE 3-continued

| | | | | |
|---|---|---|---|---|
| 7* | 6.8139 | 0.161 | | |
| 8* | 3.9851 | 0.321 | 1.544 | 55.57 |
| 9* | −4.6714 | 0.341 | | |
| 10* | −1.2759 | 0.334 | 1.544 | 55.57 |
| 11* | −0.6115 | 0.066 | | |
| 12* | −74.3815 | 0.416 | 1.535 | 56.16 |
| 13* | 0.6866 | 0.300 | | |
| 14 | Infinity | 0.210 | 1.517 | 64.20 |
| 15 | Infinity | 0.537 | | |
| Image Plane | Infinity | | | |

Constituent Lens Data

| Lens | Start Surface | Focal Length |
|---|---|---|
| 1 | 2 | 2.337 |
| 2 | 4 | −80.607 |
| 3 | 6 | −3.311 |
| 4 | 8 | 4.007 |
| 5 | 10 | 1.835 |
| 6 | 12 | −1.270 |

Aspheric Surface Data

| | 2nd Surface | 3rd Surface | 4th Surface | 5th Surface | 6th Surface | 7th Surface |
|---|---|---|---|---|---|---|
| k | −1.276E+01 | 0.000E+00 | 0.000E+00 | 0.000E+00 | −4.065E+01 | 7.001E+01 |
| A4 | 3.106E−01 | −1.927E−01 | −9.717E−02 | −1.049E−01 | −3.222E−01 | −1.157E−01 |
| A6 | −9.217E−01 | −1.230E−01 | −7.448E−01 | −1.940E−01 | 2.667E−02 | −9.919E−03 |
| A8 | 1.653E+00 | −7.112E−01 | 1.374E+00 | 5.043E−01 | 1.797E+00 | 7.145E−01 |
| A10 | −3.141E+00 | 3.549E+00 | −9.450E+00 | −4.106E+00 | −4.686E+00 | −6.355E−01 |
| A12 | 1.427E+00 | −1.026E+01 | 2.066E+01 | 6.905E+00 | 4.103E+00 | −4.130E−02 |
| A14 | −6.872E−01 | 8.852E+00 | −1.709E+01 | −3.702E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 1.469E+01 | −1.050E+00 | 3.782E−01 | −3.845E+00 | 0.000E+00 | −7.174E+00 |
| A4 | −1.686E−01 | −8.180E−02 | 7.826E−02 | −2.079E−01 | −8.998E−02 | −1.380E−01 |
| A6 | 1.895E−01 | 2.017E−02 | 9.192E−02 | 5.176E−01 | −1.059E−01 | 7.649E−02 |
| A8 | −1.084E+00 | 4.304E−02 | 2.117E−02 | −7.360E−01 | 4.358E−02 | −4.315E−02 |
| A10 | 2.567E+00 | 4.389E−02 | 4.230E−02 | 6.360E−01 | 8.555E−03 | 1.518E−02 |
| A12 | −2.807E+00 | 0.000E+00 | 0.000E+00 | −2.230E−01 | 9.935E−03 | −2.963E−03 |
| A14 | 1.114E+00 | 0.000E+00 | 0.000E+00 | 1.045E−02 | −5.867E−03 | 2.386E−04 |
| A16 | 0.000E+00 | 0.000E+00 | 0.000E+00 | 0.000E+00 | 0.000E+00 | 0.000E+00 |

As shown in Table 4 below, the imaging lens in Example 2 satisfies all the conditional expressions (1) to (11).

TABLE 4

| | |
|---|---|
| (1) 20 < vd1−vd2 < 50 | 29.99 |
| (2) 20 < vd1−vd3 < 50 | 29.99 |
| (3) 4 < f2/f3 < 32 | 24.35 |
| (4) 0.4 < f1/|f3| < 1.0 | 0.71 |
| (5) 0.1 < |r1/r2| < 0.5 | 0.28 |
| (6) 0.1 < |r7/r8| < 1.1 | 0.85 |
| (7) 0.3 < f5/f < 0.9 | 0.61 |
| (8) 0.3 < |f6|/f < 0.9 | 0.42 |
| (9) 0.9 < TLA/f < 1.3 | 1.20 |
| (10) 0.65 < TLA/2ih < 0.85 | 0.79 |
| (11) f1 > f5 | 2.337 > 1.835 |

Figure 4:
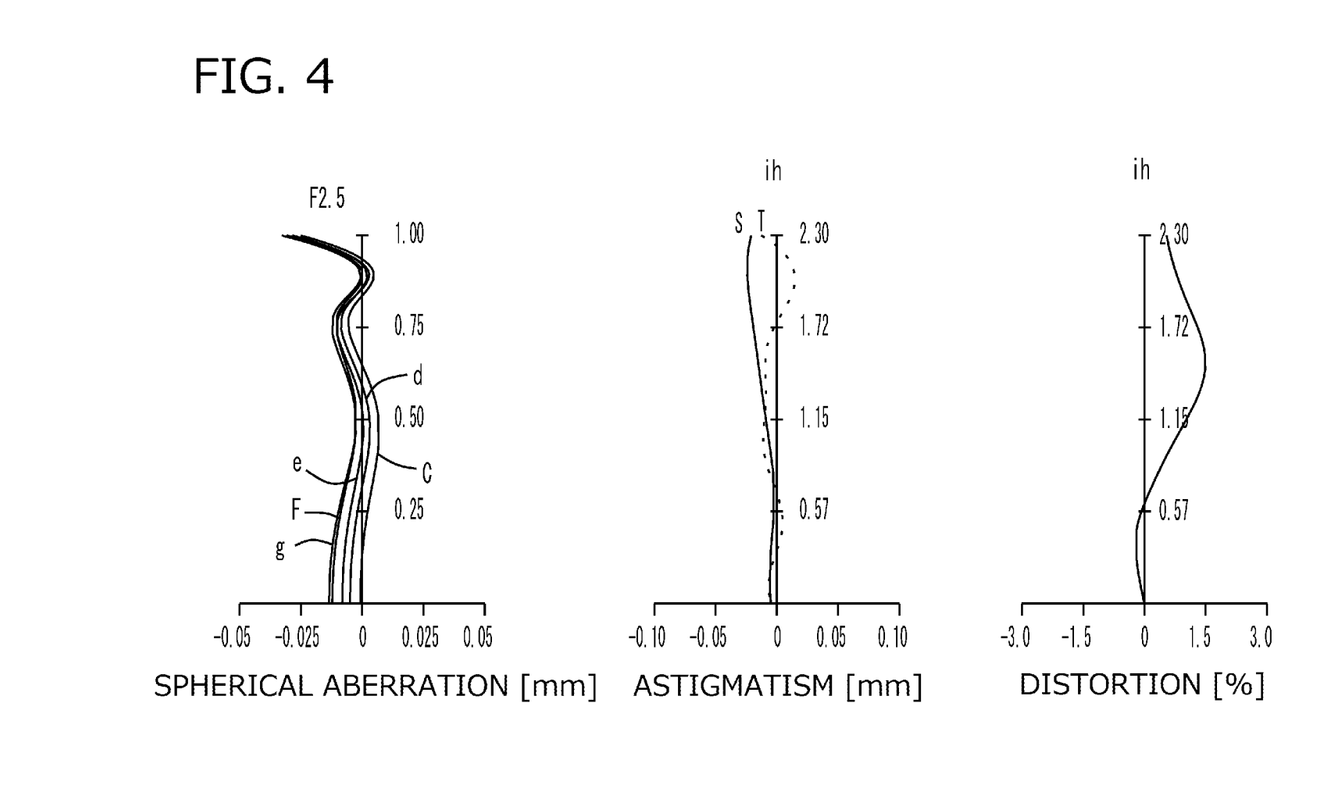
FIG. 4 shows spherical aberration, astigmatism, and distortion of the imaging lens in Example 2.

FIG. 4 shows spherical aberration (mm), astigmatism (mm), and distortion (%) of the imaging lens in Example 2. As shown in FIG. 4, each aberration is corrected properly.

Example 3

The basic lens data of Example 3 is shown in Table 5 below.

TABLE 5

Example 3
in mm
f = 2.94
Fno = 2.4
ω(°) = 37.9
ih = 2.30
TLA = 3.57
bf = 0.98

TABLE 5-continued

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.082 | | |
| 2* | 1.5581 | 0.418 | 1.544 | 55.57 |
| 3* | −5.9647 | 0.049 | | |
| 4* | −11.2988 | 0.200 | 1.614 | 25.58 |
| 5* | −50.0000 | 0.102 | | |
| 6* | −3.4765 | 0.200 | 1.614 | 25.58 |
| 7* | 6.8837 | 0.165 | | |
| 8* | 3.5800 | 0.328 | 1.544 | 55.57 |
| 9* | −6.9444 | 0.325 | | |
| 10* | −1.3072 | 0.333 | 1.544 | 55.57 |
| 11* | −0.6125 | 0.057 | | |
| 12* | 12.2624 | 0.416 | 1.535 | 56.16 |
| 13* | 0.6558 | 0.300 | | |
| 14 | Infinity | 0.210 | 1.517 | 64.20 |
| 15 | Infinity | 0.541 | | |
| Image Plane | Infinity | | | |

Constituent Lens Data

| Lens | Start Surface | Focal Length |
|---|---|---|
| 1 | 2 | 2.317 |
| 2 | 4 | −23.813 |
| 3 | 6 | −3.733 |
| 4 | 8 | 4.392 |
| 5 | 10 | 1.813 |
| 6 | 12 | −1.312 |

Aspheric Surface Data

| | 2nd Surface | 3rd Surface | 4th Surface | 5th Surface | 6th Surface | 7th Surface |
|---|---|---|---|---|---|---|
| k | −1.186E+01 | 0.000E+00 | 0.000E+00 | 0.000E+00 | −7.347E+01 | 6.795E+01 |
| A4 | 3.142E−01 | −1.988E−01 | −9.778E−02 | −5.475E−02 | −2.938E−01 | −1.197E−01 |
| A6 | −9.216E−01 | −1.638E−01 | −1.167E−01 | −1.369E−01 | 1.525E−01 | 3.076E−02 |
| A8 | 1.681E+00 | −9.117E−01 | 1.251E+00 | 5.169E−01 | 1.995E+00 | 7.324E−01 |
| A10 | −3.205E+00 | 3.849E+00 | −9.532E+00 | −4.019E+00 | −4.730E+00 | −6.269E−01 |
| A12 | 1.394E+00 | −9.085E+00 | 2.101E+01 | 7.010E+00 | 3.588E+00 | 3.281E−02 |
| A14 | −6.872E−01 | 7.637E+00 | −1.454E+01 | −3.518E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 1.073E+01 | 2.288E+01 | 4.859E−01 | −3.855E+00 | 0.000E+00 | −6.579E+00 |
| A4 | −1.825E−01 | −1.005E−01 | 6.456E−02 | −1.981E−01 | −9.632E−02 | −1.318E−01 |
| A6 | 1.625E−01 | 3.445E−03 | 1.066E−01 | 5.184E−01 | −1.085E−01 | 6.941E−02 |
| A8 | −1.066E+00 | 2.671E−02 | 3.521E−02 | −7.372E−01 | 4.160E−02 | −4.066E−02 |
| A10 | 2.551E+00 | 5.356E−02 | 3.895E−02 | 6.362E−01 | 7.583E−03 | 1.521E−02 |
| A12 | −2.834E+00 | 0.000E+00 | 0.000E+00 | −2.236E−01 | 9.526E−03 | −3.155E−03 |
| A14 | 1.195E+00 | 0.000E+00 | 0.000E+00 | 1.019E−02 | −5.265E−03 | 2.675E−04 |
| A16 | 0.000E+00 | 0.000E+00 | 0.000E+00 | 0.000E+00 | 0.000E+00 | 0.000E+00 |

As shown in Table 6 below, the imaging lens in Example 3 satisfies all the conditional expressions (1) to (11).

TABLE 6

| (1) 20 < vd1-vd2 < 50 | 29.99 |
|---|---|
| (2) 20 < vd1-vd3 < 50 | 29.99 |
| (3) 4 < f2/f3 < 32 | 6.38 |
| (4) 0.4 < f1/|f3| < 1.0 | 0.62 |
| (5) 0.1 < |r1/r2| < 0.5 | 0.26 |
| (6) 0.1 < |r7/r8| < 1.1 | 0.52 |
| (7) 0.3 < f5/f < 0.9 | 0.62 |
| (8) 0.3 < |f6|/f < 0.9 | 0.45 |
| (9) 0.9 < TLA/f < 1.3 | 1.22 |
| (10) 0.65 < TLA/2ih < 0.85 | 0.78 |
| (11) f1 > f5 | 2.317 > 1.813 |

Figure 6:
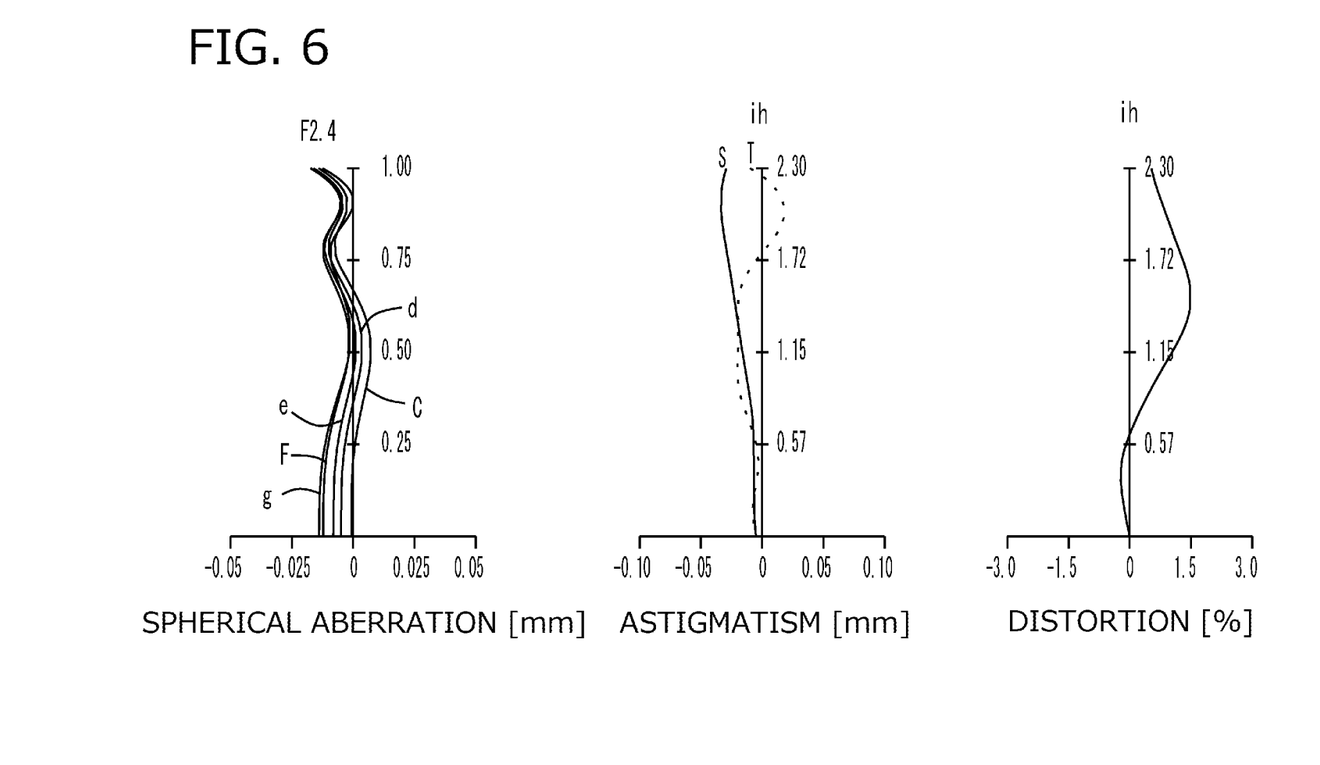
FIG. 6 shows spherical aberration, astigmatism, and distortion of the imaging lens in Example 3.

FIG. 6 shows spherical aberration (mm), astigmatism (mm), and distortion (%) of the imaging lens in Example 3. As shown in FIG. 6, each aberration is corrected properly.

As explained above, the imaging lens according to the preferred embodiment of the present invention is low-profile enough to meet the growing demand for low-profileness, with total track length TLA of 4.0 mm or less and a ratio of total track length TLA to maximum image height ih (TLA/2ih) of about 0.8, though it uses six constituent lenses. In addition, the imaging lens offers a wide field of view of 70 degrees or more and high brightness with an F-value of 2.5 or less, corrects aberrations properly and features low cost.

When any one of the imaging lenses composed of six constituent lenses according to the Examples of the present invention is used for an optical system built in an image pickup device mounted in an increasingly compact and low-profile mobile terminal such as a smartphone, mobile phone or PDA (Personal Digital Assistant), or a game console or an information terminal such as a PC, or a home appliance with a camera function, it contributes to the compactness of the image pickup device and offers high camera performance.

The effects of the present invention are as follows.

According to the present invention, there is provided a compact low-cost imaging lens which meets the demand for low-profileness and offers high brightness with an F-value of 2.5 or less and a wide field of view and corrects various aberrations properly.

What is claimed is:

1. An imaging lens which forms an image of an object on a solid-state image sensor, in which elements are arranged in order from an object side to an image side, comprising:
   a first lens with positive refractive power having a convex surface on the object side;
   a second lens with negative refractive power as a meniscus lens having a concave surface on the object side;
   a third lens as a double-sided aspheric lens having a biconcave shape near the optical axis;
   a fourth lens as a double-sided aspheric lens;
   a fifth lens with positive refractive power having a convex surface near an optical axis on the image side and a concave surface near the optical axis on the object side; and
   a sixth lens with negative refractive power as a double-sided aspheric lens having a concave surface near the optical axis on the image side,
   wherein the elements are each arranged with an air gap from a neighboring element;
   the image-side surface of the sixth lens has a pole-change point off the optical axis; and conditional expressions (1) and (2) below are satisfied:

$$20 < vd1 - vd2 < 50 \quad (1)$$

$$20 < vd1 - vd3 < 50 \quad (2)$$

where
vd1: Abbe number of the first lens at d-ray
vd2: Abbe number of the second lens at d-ray
vd3: Abbe number of the third lens at d-ray.

2. The imaging lens according to claim 1, wherein a conditional expression (3) below is satisfied:

$$4 < f2/f3 < 32 \quad (3)$$

where
f2: focal length of the second lens
f3: focal length of the third lens.

3. The imaging lens according to claim 1, wherein a conditional expression (4) below is satisfied:

$$0.4 < f1/|f3| < 1.0 \quad (4)$$

where
f1: focal length of the first lens
f3: focal length of the third lens.

4. The imaging lens according to claim 1, wherein a conditional expression (5) below is satisfied:

$$0.1 < |r1/r2| < 0.5 \quad (5)$$

where
r1: curvature radius of the object-side surface of the first lens
r2: curvature radius of the image-side surface of the first lens.

5. The imaging lens according to claim 1, wherein the second lens has an aspheric shape in which the negative refractive power becomes weaker with increasing distance from the optical axis and changes to positive refractive power in a peripheral portion.

6. The imaging lens according to claim 1, wherein the image-side surface of the third lens has an aspheric shape in which negative refractive power becomes stronger with increasing distance from the optical axis.

7. The imaging lens according to claim 1, wherein the fourth lens has a biconvex shape near the optical axis and satisfies a conditional expression (6) below:

$$0.1 < |r7/r8| < 1.1 \quad (6)$$

where
r7: curvature radius of the object-side surface of the fourth lens
r8: curvature radius of the image-side surface of the fourth lens.

8. The imaging lens according to claim 1, wherein conditional expressions (7) and (8) below are satisfied:

$$0.3 < f5/f < 0.9 \quad (7)$$

$$0.3 < |f6|/f < 0.9 \quad (8)$$

where
f: focal length of the overall optical system of the imaging lens
f5: focal length of the fifth lens
f6: focal length of the sixth lens.

* * * * *